Sept. 13, 1955     M. TAYLOR ET AL     2,717,980

FOLLOW-UP TYPE OF ELECTRIC MOTOR CONTROL SYSTEM

Filed Oct. 24, 1951     4 Sheets-Sheet 1

INVENTORS.
MALCOLM TAYLOR
ARTHUR F. CANN

BY
*Killman and Kerst*
ATTORNEYS

FIG. 2

INVENTORS.
MALCOLM TAYLOR
ARTHUR F. CANN

Fig. 5

Sept. 13, 1955  M. TAYLOR ET AL  2,717,980
FOLLOW-UP TYPE OF ELECTRIC MOTOR CONTROL SYSTEM
Filed Oct. 24, 1951  4 Sheets-Sheet 4

FIG. 6

INVENTORS.
MALCOLM TAYLOR
ARTHUR F. CANN
BY
Killman and Kerst
ATTORNEYS

United States Patent Office 2,717,980
Patented Sept. 13, 1955

2,717,980

FOLLOW-UP TYPE OF ELECTRIC MOTOR CONTROL SYSTEM

Malcolm Taylor and Arthur F. Cann, Baltimore, Md., assignors to Bendix Aviation Corporation, Towson, Md., a corporation of Delaware Application October 24, 1951, Serial No. 252,955

13 Claims. (Cl. 318—19)

This invention relates to remote control and more particularly to the remote control of the positioning of one or more shafts in response to electrical signals.

The invention is particularly useful in radio communication systems to display identification symbols of a calling station in response to teletype code signals consisting of a set of mark and space elements corresponding to each symbol.

It is an object of the invention to provide a remote control system capable of selectively controlling the positioning of one or more shafts in any of a large number of positions and accomplishing this result by the use of only a pair of wires between the control station and the remote location.

It is another object to provide such a system which can utilize known signalling codes for effecting control.

It is a further object of the invention to provide such a system which is simple and inexpensive to construct and rugged and reliable in operation.

These and other objects and advantages of the invention are realized by a system employing a bank of memory switches controlling the positioning of each shaft. The switches are of the double throw type and each is actuatable to one or the other of its two positions by the receipt of an electrical impulse over a respective one of the two wires extending between the two stations.

The memory switches of all banks are mounted adjacent a rotatable member which is angularly indexed as each switch is positioned. The indexing action accompanying the positioning of the last switch closes the energizing circuit to a motor which drives the shafts to be positioned.

The motor drives the shafts to be positioned through clutches and detenting means are provided for stopping the rotation of the shafts at positions determined by detent controlling circuits sensitive to shaft position.

Each detent controlling circuit includes one of the banks of memory switches and a wafer type switch having a pair of insulated rotatable central wafers with indented edges, the indentations of one being the reverse of the indentations of the other. These central rotatable wafers rotate as a unit and make peripheral contact with a plurality of contact elements each grounded through one of the memory switches of the bank mentioned above. For every combination of switch settings in the bank there is one and only one position of the central wafers in which the motor energizing circuit is interrupted. Each of the shafts to be positioned is rotatable with the central wafers of a respective one of the wafer switches.

A modification of the invention utilizes, in place of memory switches, a plurality of memory relays together with a stepping switch for their selective energization in accordance with impulse signals. A holding circuit is provided for maintaining the relay settings. The shafts are sequentially positioned, by the same relays, the holding circuit being disabled with the positioning of each shaft.

Figures 1, 3, 4:
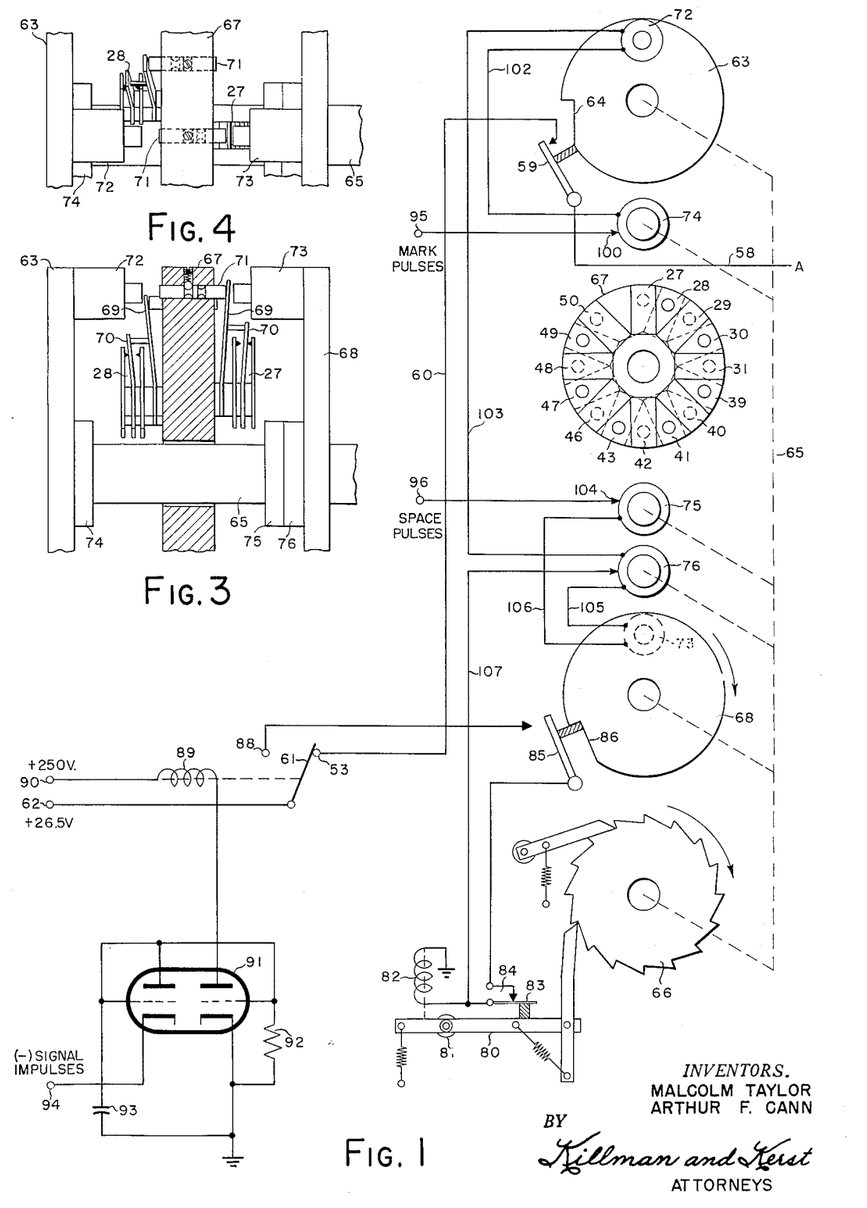
Figs. 1 and 2 together constitute a schematic circuit diagram of a remote control system embodying the invention.
Figs. 3 and 4 are elevational views of portions of the memory switch assembly of Fig. 1; and, Figs. 5 and 6 together constitute a schematic circuit diagram of a second embodiment of the invention.
Figure 2:
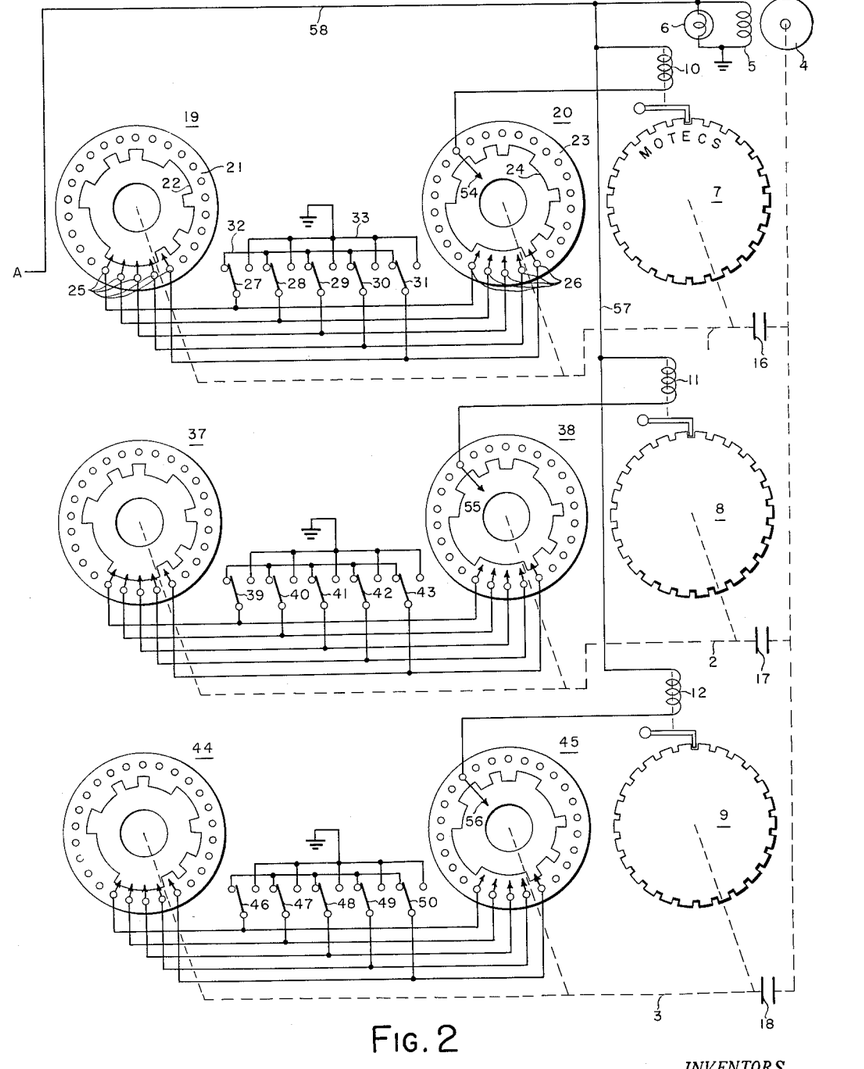

Referring now more particularly to the drawings, there is shown in Figs. 1 and 2 a preferred embodiment of the invention in which shafts 1, 2 and 3, indicated by dashed lines in Fig. 2, are positioned by a motor 4. An exciting coil 5 is provided for the energization of the motor 4 and an indicating light 6 is connected in parallel with the exciting coil 5 to indicate to an operator that the motor is being energized and to illuminate the code indicia which indicate the positions of the shafts.

Mounted respectively on the shafts 1, 2 and 3 are dials 7, 8 and 9 having toothed peripheries. These dials may bear on their face letters or other code indicia referred to above which correspond to the peripheral teeth. Various means may be provided to indicate to an observer the position of the dials, such as a reference mark established at one point along the periphery of the dial or a masking means having a window through which only one of the letters or indicia may be seen at a time. Coacting with the two peripheries of the dial are detenting relays 10, 11 and 12, respectively. These relays are shown in their deenergized position with their detents engaging the teeth of the respective dials and preventing them, and the shafts to which they are connected, from rotation.

Clutches 16, 17 and 18 are provided in the respective shafts for a purpose which will be later described.

Mounted on the shaft 1 for rotation therewith are a pair of wafer switches 19 and 20. The switch 19 is composed of a fixed annular exterior wafer 21 and a rotatable central wafer 22, while the switch 20 is composed of a fixed annular exterior wafer 23 and a rotatable central wafer 24. The fixed wafers 21 and 23 are formed of insulating material. The rotatable wafers 22 and 24 are formed of conducting material in their peripheral portions and these portions have parts of their periphery indented, with the indentations of one wafer matching the unindented portions of the other. Secured to the fixed wafers 21 and 22 are a plurality of contact members 25 and 26. These contact members are in identical locations on their respective wafers and make contact with the unindented portions of the central wafers 22 and 24. Each of the contact members 25 is connected to an identically located contact member 26 and each of these connected pairs of contacts is connected to the movable contact of a respective one of memory switches 27, 28, 29, 30 and 31. Corresponding fixed contact members of the memory switches 27 to 31 are connected together by a conductor 32 and the remaining fixed contact members of these switches are connected together by a conductor 33 and grounded.

Mounted on the shaft 2 are a pair of wafer switches 37 and 38, identical with switches 19 and 20. The fixed contact members of these switches are connected to memory switches 39 to 43, inclusive, the fixed contacts of which are connected to ground in the same manner as those of memory switches 27 to 31.

Connected to the shaft 3 is a pair of wafer switches 44 and 45 and their associated memory switches 46 to 50. This group of switches is identical with those described with respect to shafts 1 and 2.

Mounted on the annular wafer 23 of the wafer switch 20 is a fixed contact member 54 which makes contact with the annular conductive portion of the central wafer 24. This member will maintain continuous contact with the wafer 24, regardless of its angular position. Similar contact members 55 and 56 are mounted on the annular wafers of the switches 38 and 45. Contact members 54, 55 and 56 are connected, respectively, to one terminal of each of the relay coils of relays 10, 11 and 12. The other terminals of these coils are connected to a conductor 57. This conductor and the motor energizing coil 5 are connected in parallel to a conductor 58 which terminates in the movable contact of a switch 59 shown on Fig. 1. The fixed contact of this switch is connected by conductor 60 to a fixed contact 53 of a single pole, double throw switch 61, the movable contact of which is connected to a source of motor energizing voltage at the terminal 62.

The movable contact of switch 59 makes insulated contact with the periphery of a disk 63 which normally maintains the switch in its open position. At one point on the periphery of the disk, there is provided a cam portion 64 which allows the switch to close. The disk 63 is mounted on a shaft 65 which also carries a ratchet wheel 66. This shaft extends through the center of a stationary disk 67 upon which are mounted, in a radially extending fashion, the memory switches 27 to 31 and 39 to 43 and 46 to 50 which were described above.

The memory switches are mounted in alternation on opposite sides of the disk and extend completely around the periphery except for one space between switches 27 and 50 which is left vacant.

The disk 67 is positioned adjacent the disk 63, as shown more clearly in Figs. 3 and 4. Mounted on the shaft 65 on the opposite side of disk 67 from disk 63 is another disk 68.

The memory switches are of a known type with two fixed contacts, as shown in Fig. 3, and with the movable contact normally spring biased into contact with one fixed contact. As mounted on the disk 67 the fixed contacts lie in planes normal to the disk and the movable contact is normally touching the fixed contact which is closer to the disk. An elongated actuating member 69 is provided for the movable contact 70 of each memory switch. Extending laterally through the disk in line with the end of each actuating member is a pin 71. The pins are slidable through the disk between two detented positions in one of which the end of the pin forces the adjacent actuating member to move its connected contact against the outer fixed contact of the switch. In the other detented position, the actuating member is not flexed.

The disk 63 has mounted on the side of it adjacent the disk 67, a solenoid 72. The solenoid when actuated pushes the pin 71 adjacent to it to the detented position in which it protrudes from the opposite side of the disk. The disk 68 has mounted on it a similar solenoid 73. It is located opposite solenoid 72.

The shaft 65 carries a slip ring 74 mounted adjacent the disk 63, and a pair of slip rings 75 and 76 adjacent the disk 68.

Located in operative relation to the periphery of the ratchet wheel 66 is a ratchet lever 80, pivoted about the point 81 and spring biased to the position shown. The armature of a relay coil 82 is connected to the lever 80 in a manner to pull down the end of the lever adjacent the ratchet wheel when the relay coil 82 is energized. Mounted on the end of the lever 80 nearer the ratchet wheel is the movable contact 83 of a single pole, single throw switch 84.

A single pole, single throw switch 85 is located near the edge of the disk 68 with the movable contact member thereof in insulated contact with the periphery of the disk. This contact keeps the switch closed except at one position of the disk at which the movable contact member is received in a cammed recess 86 formed in the periphery. The fixed contact member of the switch 85 is connected by a lead 87 to a fixed contact element 88 of the switch 61.

The movable contact element of switch 61 is operated by the armature of a relay coil 89 which has one terminal connected to a source of positive voltage at terminal 90 and the other connected to the plate of a triode in a dual triode tube 91. The cathode of this triode is grounded and its grid is connected through a resistor 92 to ground. The grid is also connected directly to the plate and grid of the second triode in the envelope and through a capacitor 93 to ground. The cathode of the second triode is connected at the terminal 94 to the source of the signal impulses which operate the memory switches.

The system is adapted to be operated by signal impulses from two sources, the impulses being intermixed in accordance with a code such as the familiar five impulse teletype code. In such a code the impulses from one source are usually designated "mark" pulses and those from the other source "space" pulses. In the system illustrated mark pulses are made available at a terminal 95, and space pulses are applied at a terminal 96.

The terminal 95 is connected through a brush 100 to the slip ring 74 and this slip ring is connected by a conductor 102 to one terminal of the coil of solenoid 72. The other terminal is connected by a conductor 103 to the slip ring 76.

The terminal 96 is connected by a brush 104 to the slip ring 75. This slip ring is connected by a conductor 106 to one terminal of the coil of solenoid 73, the other terminal being connected by a conductor 105 to the slip ring 76. This slip ring is also connected through a brush and conductor 107 to one terminal of relay coil 82 the other terminal being grounded. The ungrounded terminal of this coil is also connected to the movable contact 83 of switch 84.

The operation of the system shown in Figs. 1 to 4 will now be described. With the system is its quiescent state the motor energizing circuit is interrupted at the switch 59 and the circuits for the energizing of the detenting relays 10, 11 and 12 are interrupted at this point and in the memory switches. The detents are thus holding the dials 7, 8 and 9 immovable.

The shaft 65 and the elements it carries are in the positions shown in Fig. 1. The movable contact member of switch 61 will be in contact with fixed contact member 88. It will be held in this position by the flow of plate current of the right-hand triode of tube 92 through the relay coil 89.

The armatures of solenoids 72 and 73 will be lined up with the actuating pin 71 of the memory switch 27. The switches 59 and 85 will be in their open positions.

Upon the receipt of the first mark or space impulse, the proper solenoid 72 or 73 will be energized and the memory switch 27 positioned accordingly. The impulse, whether it be from the mark or space source, will be applied to the cathode of the left-hand, dual connected triode of tube 91 and will cause the triode to conduct. This will charge the condenser 93 with the upper plate negative and the negative voltage will be applied to the grid of the right-hand triode and will drive it to cutoff. The cessation of current flow through the relay coil 89 will cause the movable contact element of switch 61 to be moved into contact with fixed contact 53. The values of condenser 93 and resistor 92 are selected to provide for the discharge of the condenser at a rate such that the relay coil 89 will not be energized for five seconds following the receipt of a signal impulse.

An impulse applied to either solenoid 72 or 73 will be applied therefrom to slip ring 76. Impulses applied to this ring will be communicated by conductor 107 to the relay coil 82. This will cause the right-hand end of lever 80 to be drawn downwardly. The termination of the impulse will release the lever 80 which will be spring driven back to its position as illustrated, thus stepping the shaft 65 around until the armatures of the soelnoids 72 and 73 are lined up with the actuating pin 71 for the switch 28.

As further signal impulses are received the above action will be repeated, a new memory switch being actuated with the reception of each pulse and the shaft 65 being stepped around to bring the solenoids 72 and 73 opposite the next memory switch at the termination of each impulse. The switch 85 will be closed by the rotation of disk 68 and will remain so. The switch 59 will be maintained in its open position.

After the receipt of the fifteenth impulse the solenoids 72 and 73 will be left opposite the blank space between the memory switches 50 and 27. The movable contact of switch 59 will, at the same time, drop into the notch 64 and the switch will close. This completes the motor energizing circuit which comprises terminal 62, switch 61 including contact 53, conductor 60, switch 59, conductor 58 and coil 5. Assuming that the settings of memory switches in the three banks have been changed from those shown the circuit through the wafer switches and the memory switches is completed from the conductor 58 to ground.

The detents of relays 10, 11 and 12 will accordingly be lifted and the motor will drive the shafts 1, 2 and 3 until the respective wafer switches arrive at such settings that the detent operating circuits are again interrupted. This condition will exist at one setting of the wafer switch for each possible combination of memory switch settings. As each detent operating circuit is interrupted the corresponding dial will be locked in position by its detent and the shaft will be stopped. The motor will continue to run, by virtue of the slipping clutches 16, 17 and 18, until the charge has leaked off condenser 93 to such an extent that the right-hand triode of tube 92 resumes conduction. When this occurs the movable contact element of switch 61 will be drawn against fixed contact 88 and the motor energizing circuit broken.

This switching action will, however, complete a circuit from the terminal 62 through contact 88 and switch 85, which will still be closed, through switch 84 and relay coil 82 to ground. This will cause the ratchet lever 80 to be drawn down, opening switch 84. Lever 80 will then be drawn up to its illustrated position, stepping shaft 65 to its illustrated position in which the switch 85 is open. The system will now await a new series of signal impulses.

If the same series of impulses as before is received again the shafts will not turn, since the detent operating circuits will remain open. If signals for a complete code group of fifteen elements are not received the ratchet wheel will not reach the fifteenth position until the relay coil 89 is energized, five seconds after the last signal impulse, closing the circuit through switch 85 and opening the circuit to the motor and lamp. The ratchet wheel will be stepped around to the position shown but the motor and lamp will not be energized while it is passing the fifteenth position and thus no code will be displayed.

Figure 5:
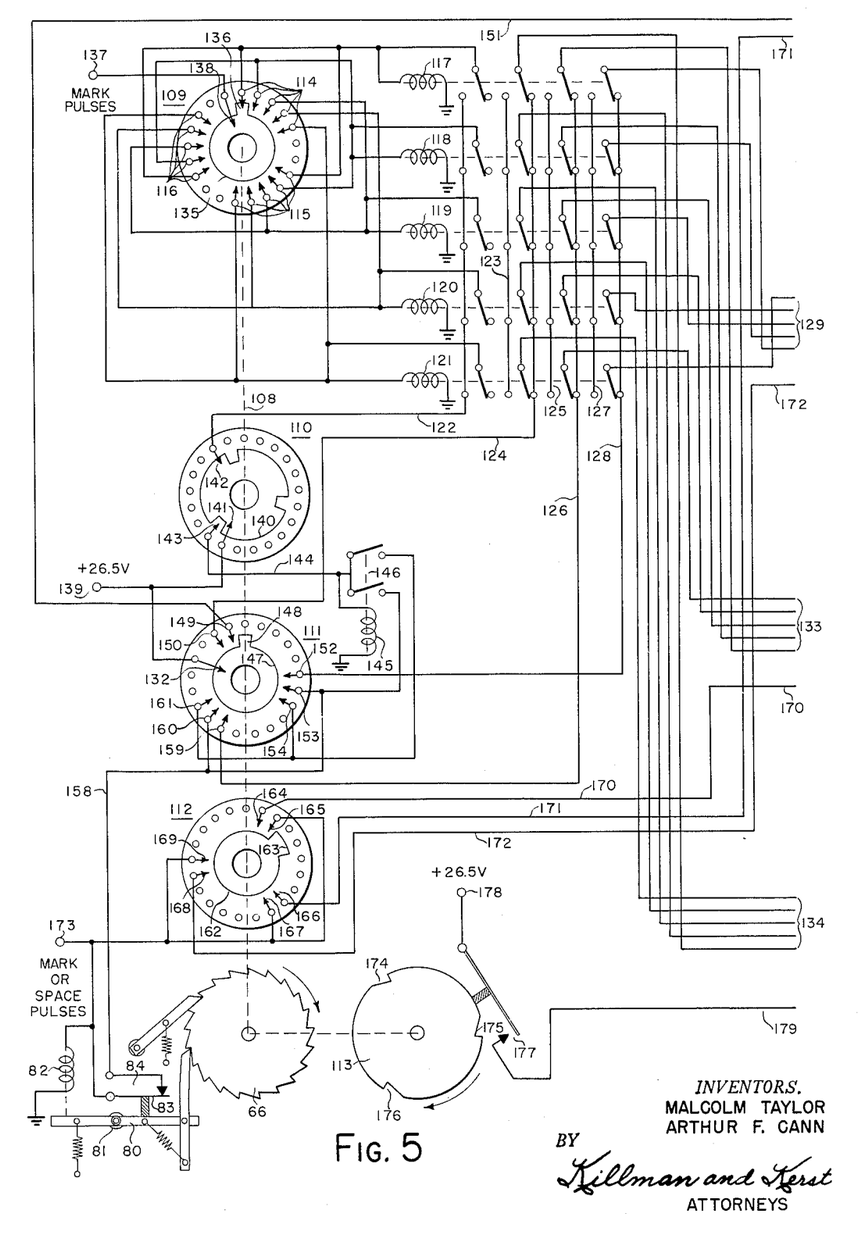
Figure 6:
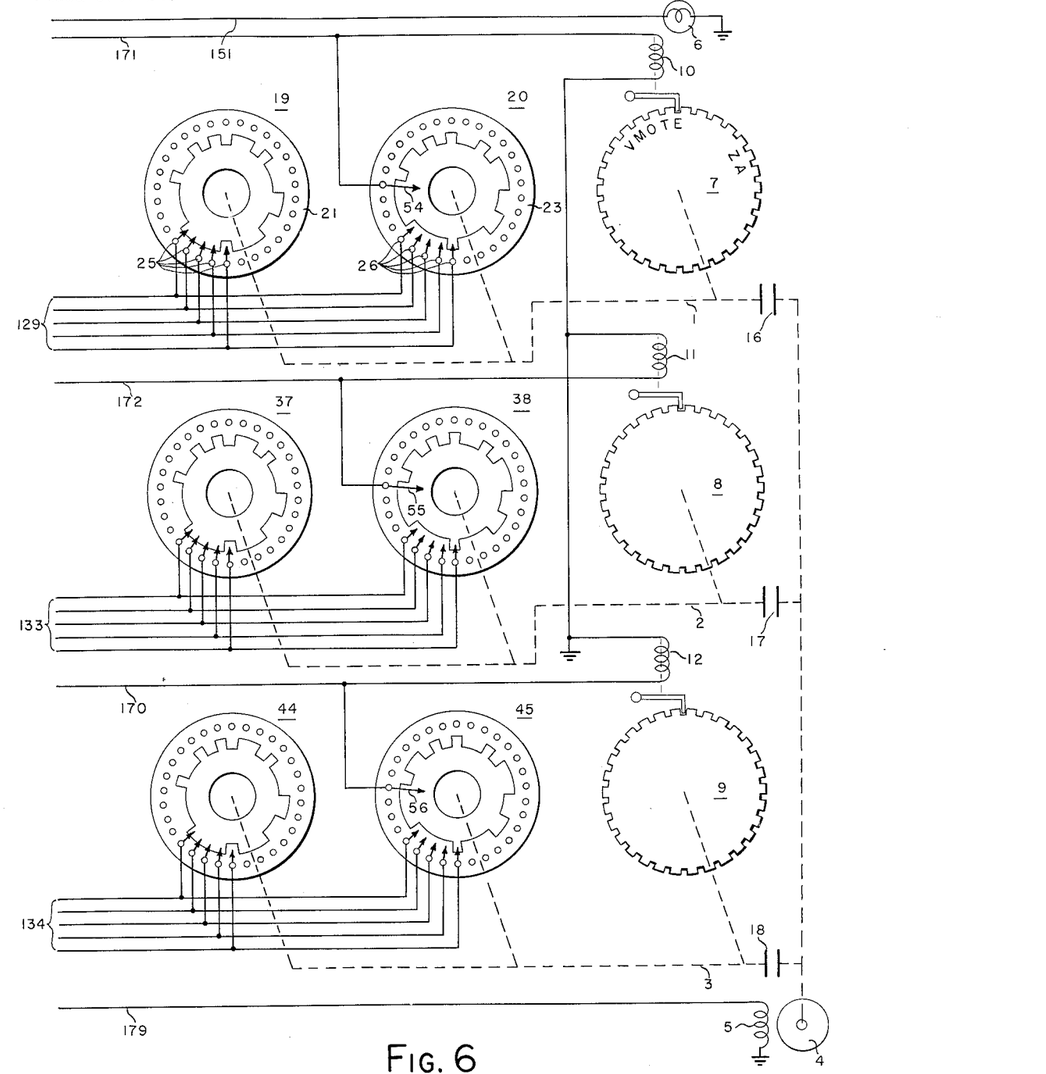

The embodiment illustrated in Figs. 5 and 6 is similar to that of Figs. 1 to 4, the chief differences being that, in place of the memory switches of the first embodiment, memory relays are utilized and that each shaft is positioned in turn, the motor is then stopped, signals for the next shaft positioning are received and it is positioned.

Mounted on a shaft 108 are four wafer-type switches 109, 110, 111 and 112. This shaft also carries the ratchet wheel 66 and a cam plate 113. The ratchet wheel 66 has associated with it the same stepping mechanism as was shown in Fig. 1, including the switch 84, lever 80 and relay coil 82. It requires 21 steps for a complete rotation of the shaft 108.

The wafer switch 109 has mounted on its non-conductive outer wafer three spaced groups of five contact elements. The elements of these groups are numbered 114, 115 and 116. Adjacent the switch 109 are five relays 117, 118, 119, 120 and 121. The armature of each of these relays operates four single pole, double throw switches. The relays are shown arranged in a vertical row with the respective switches actuated by the various armatures in vertical alignment. The left-hand fixed contacts of the left-hand bank of switches are serially connected by a conductor 122. The right-hand fixed contacts of this bank of switches are insulated. The left-hand fixed contacts of the second row of switches are serially connected by a conductor 123 and the right-hand contacts by a conductor 124. The left-hand fixed contacts of the third row of switches are serially connected by a conductor 125 and the right-hand contacts by a conductor 126. The left-hand fixed contacts of the right bank of switches are serially connected by a conductor 127 and the remaining fixed contacts are serially connected by a conductor 128.

Proceeding in a clockwise direction about switch 109 the first contact elements of banks 114, 115 and 116 are connected in parallel to one terminal of the coil of relay 117 and to the movable contact element of the left-hand switch operated by this relay. The remaining terminal of the relay coil is grounded. The second contact element of each of the banks 114, 115, 116 is similarly connected with respect to the relay 118 and the third, fourth and fifth contacts are connected in the same manner with respect to relays 119, 120 and 121.

In the right-hand vertical row of movable contact elements operated by the relays 117 to 121 each element is connected by an individual conductor of a group of conductors 129, to a respective one of the contact elements 25 of wafer switch 19 and of the contact elements 26 of wafer switch 20. The movable contact elements of the next adjacent vertical row are similarly connected by conductors of a group 133 to the corresponding contact elements of wafer switches 37 and 38. A group of conductors 134 in a like manner connects the movable contact elements of the next adjacent row to the contact elements of wafer switches 44 and 45.

The wafer switch 109 has a central wafer 135, the conductive portion of which does not make contact with the fixed contact elements of the banks 114, 115 and 116 except at one point where an extension 136 wipes one fixed contact at a time as the central wafer is stepped around.

A source of mark impulses is indicated as the terminal 137. This is connected to a contact element 138 which wipes the central wafer 135 through its complete rotation.

Motor energizing voltage is applied to the system at a terminal 139. The switch 110 has a central wafer 140 which is indented at three equi-spaced points around its edge. The terminal 139 is conected to a fixed contact element 141 which makes continuous contact with the wafer 140 throughout its rotation. Another contact element 142 contacts the wafer 140 except when one of its three indentations is beneath it. The indentations are each one step wide. The element 142 is connected to the conductor 122. A third contact element 143 is carried by the outer wafe of the switch 110 and is spaced six steps from the element 142 in a counterclockwise direction. This element is connected by a conductor 144 to one terminal of the coil of a relay 145, the other terminal of the coil being grounded. The armature actuated by the relay 145 is connected to the poles of a double pole, single throw switch 146 which is normally in an open state. The relay has a five second delay in closing.

The wafer switch 111 has a central wafer 147 with a conducting extension 148 which is one step wide. This extension is lined up with the extension 136 of the central wafer of switch 109 and rotates in step with it. The non-conductive outer wafer of switch 111 has mounted on it a contact element 132 which remains in constant wiping contact with the conductive portion of the central wafer. This element is connected to the terminal 139. The outer wafer of switch 111 is provided with three other groups of contact elements which can make contact only with the extension 148 of the central wafer. Considering the illustrated position of the extension as the home position of the shaft 108 and the members rotating with it, the outer wafer carries two contact elements 149 and 150 which are respectively one and two steps counterclockwise of the home position. Element 150 is connected to conductor 124 and element 149 is connected by a conductor 151 through the lamp 6 to ground. A group of three elements 152, 153 and 154 is also carried by the outer wafer, with the elements spaced respectively five, six and seven steps clockwise of the home position. Element 152 is connected to conductor 128. Elements 153 and 154 are connected to respective fixed contact elements of switch 146. Element 153 is also connected by a conductor 158 to the fixed contact element of switch 84. A third group of contact elements is carried by the outer wafer, the elements 159, 160 and 161 of which are located respectively twelve, thirteen and fourteen steps clockwise of the home position. Element 159 is connected to conductor 126. Element 160 is connected to element 153. Element 161 is connected to element 154.

The disk 112 has a central wafer 162 with an extension 163 two steps wide. The remainder of the wafer does not contact any of the contact elements carried by the outer wafer. These elements are six in number, in three groups of two each. Elements 164 and 165 are respectively one and two steps clockwise of the home position, 166 and 167 are respectively eight and nine steps and elements 168 and 169 are fifteen and sixteen steps clockwise of the home position. Contact element 164 is connected by a conductor 170 to contact element 56 of wafer switch 45, shown on Fig. 6, and to one terminal of relay coil 12, the other terminal being grounded. In like manner contact elements 166 and 168 are connected respectively by conductors 171 and 172 to contact elements 54 and 55 of wafer switches 20 and 38 and to the ungrounded ends of relay coils 10 and 11. Contact elements 165, 167 and 169 are connected together and to a terminal 173 to which both mark and space impulses are applied. This terminal is also connected to one end of the relay coil 82 and to the movable contact element 83 of switch 84.

The cam disk 113 has formed on its periphery three notches 174, 175 and 176. This disk cooperates with the movable contact element of a switch 177. This element is connected to a terminal 178 which is supplied with motor energizing voltage. The fixed contact element of switch 178 is connected by a conductor 179 to one terminal of the motor energizing winding 5, the other terminal of which is grounded.

Turning now to the operation of the system of Figs. 5 and 6, let it be assumed that the system is in the condition shown with the shaft 108 in the home position. The motor energizing circuit is broken at the switch 177. The light circuit is broken at the contact element 149 of the wafer switch 111 and the detent operating circuits are broken in the wafer switches 19, 20, 37, 38, 44 and 45. The movable contact elements of the switches operated by the relays 117 to 121 are mechanically stressed to lie against their right-hand fixed contact elements but no energy is being applied to the conductors 124, 126 and 128. No energy is being applied to the relay coils 145 and 82. The extension 136 of the central wafer of switch 109 is in contact with the first fixed contact of bank 114.

As the first mark or space pulse is received the relay coil 82 is energized, drawing up the left-hand end of lever 80 and releasing it at the termination of the pulse to rotate the shaft 108 by one step. If the pulse is a mark pulse it is applied at the switch 109 to the relay 117 and all the movable contact elements actuated thereby are drawn against their left-hand fixed contacts. This completes a circuit from terminal 139, through the central wafer of switch 110, the conductor 122, the movable contact of the left-hand switch actuated by relay, to ground. This acts as a holding circuit. As the five impulse signals which govern the positioning of the first shaft are received the shaft 109 is rotated through its first five steps in the manner described above. When a mark signal is received the relay in circuit with terminal 137 will be actuated, its switches drawn to the left and held in that position by the holding circuit. The relays in circuit with the terminal 137 when space signals are received will not be actuated and their switches will be maintained in their right-hand positions.

As the shaft 108 is rotated through its first step, a conductive connection is completed between contact elements 141 and 143 by the central wafer 140 of switch 110. This causes energy from terminal 139 to be applied to relay coil 145. This relay is slow acting, having a five second delay. The switch 146 will be closed by it five seconds after the above circuit is closed. This will apply energy from terminal 139 through conductor 144, switch 146 and conductor 158 to the fixed contact of switch 84, causing the shaft 109 to be stepped around until the circuit is broken at contact element 143 by the arrival of one of the indentations of the central wafer 140. This will not happen unless the receipt of the group of five signal pulses is interrupted, since a normal group will be completed much sooner and the relay 145 deenergized by normal rotation of the shaft 109.

As the group of five signal pulses is completely received and the shaft 109 is rotated through its next step, the extension 148 of the central wafer of switch 111 will come to rest on contact element 152, and the extension 163 of the central wafer of switch 112 will span the contact elements 166 and 167. This completes a circuit through switch 111 between the terminal 139 and conductor 128, which circuit will extend through all the movable contact elements touching the fixed contacts of this conductor and through the corresponding conductors of the group 129 to the contacts 25 and 26 and the central wafers of the switches 19 and 20 which operate as in Figs. 1 and 2. The circuit will continue through the relay coil 10 to ground. At the same time the notch 174 of cam disk 113 will have received the movable contact element of switch 177 causing that switch to close and motor coil 5 to be energized. The spanning of contact elements 166, 167 at the switch 112 connects conductor 171 and the energy applied to it to the relay coil 82 for the actuation of the stepping mechanism.

The motor turns the shaft 1, as in Figs. 1 and 2, until the circuit through switches 19 and 20 is interrupted. The interruption also breaks the connection between relay coil 82 and the source of energy at terminal 139 and the stepping mechanism completes its operation, rotating the shaft another step.

In the new position at switch 110 the holding circuit for the relays 117 to 121 is broken. Energy is applied to the fixed contact element of switch 84 of the stepping mechanism from terminal 139 through contact element 153 of switch 111. This actuates the stepping mechanism to turn the shaft 108 another step.

In this position of the shaft 108 the extension 136 of the central wafer of switch 109 is touching the first fixed contact element of the bank 115. If signals are received the system proceeds, as described above, to the positioning of shaft 2. If no signals are received in this position, no further action will take place, since one of the indentations of the central wafer of switch 110 interrupt the circuit from terminal 139 through switch 146 at contact element 143. If the system is operating with the relay coil 145 energized by virtue of a failure to receive part of the first group of pulses the coil will continue to be energized in this position by current flow through the switch 111 including contact element 154, and through the upper half of switch 146. Energy for the actuation of the stepping mechanism will also travel this route going through the upper half of switch 146 then through the lower half into conductor 158.

The operation of the system will proceed, as described above, through the positioning of shafts 2 and 3. When this sequence of events is completed the shaft 108 will be resting in the position which is one step from the home position. The extension 148 of the central wafer of switch 111 wil be resting on the contact element 149, thus completing a circuit through this switch from terminal 139, through conductor 151 and the light 6 to ground. The light will illuminate the selected letters on the dials and the system will remain quiescent until an impulse is applied locally to the terminal 173 to step the shaft into the home position.

In Fig. 2 the wafer switches 19, 20, etc., have twenty-six positions while the same switches as shown in Fig. 6 have thirty positions which accommodates the standard teletype code. It should be understood that either number of positions can be used in either system or the number may be varied to accommodate the number of code characters which are to be employed. The system may also be used with either more or less than the number of shafts shown.

What is claimed is:

1. In a mechanism for selectively positioning a plurality of shafts, comprising driving means for said shafts, and detenting means individual to said shafts for stopping the rotation thereof in any one of a plurality of predetermined angular positions: an energizing circuit for each of said detenting means, a source of energy in said circuit, said circuit comprising branches constituting a plurality of parallel conductive paths, switching means actuated in acordance with the rotation of the one of said shafts coacting with said detenting means to selectively complete said branches, the selection of braches so completed differing for each detented position of said shaft, the said switching means simultaneously cross connecting those of said branches not so completed, a two-position switch in each of said branches, a cross-connecting bus for said branches, each of said switches in a first position connecting two portions of the branch in which it is located and in its second position interrupting said branch and connecting the one of said portions tereof which is operated on by said switching means to said cross-connecting bus, switch operating means responsive to energy impulses to selectively position said switches and means applying energy impulses to said switch operating means.

2. In a mechanism for selectively positioning a plurality of shafts, comprising driving means for said shafts, and detenting means individual to said shafts for stopping the rotation in any one of a plurality of predetermined angular positions: an energizing circuit for each of said detenting means, a source of energy in said circuit, said circuit comprising branches constituting a plurality of parallel conductive paths, switching means actuated in accordane with the rotation of the one of said shafts coacting with said detenting means to selectively complete said branches, the selection of branches so completed differing for each detented position of said shaft, the said switching means simultaneously cross-connecting those of said branches not so completed, a source of energy impulses and means operable upon said branches in response to said impulses to selectively interrupt said branches and to simultaneously cross-connect the portions of the branches so interrupted which are operated on by said switching means.

3. In a mechanism for selectively positioning a plurality of shafts, comprising driving means for said shafts and detenting means individual to said shafts for stopping the rotation thereof in any one of a plurality of predetermined angular positions: an energizing circuit for each of said detenting means, a source of energy in said circuits, each of said energizing circuits comprising branches constituting a plurality of parallel conductive paths, a two position switch in each of said branches, a cross-connecting bus for said branches, each of said switches in a first position completing the branch in which it is located and in its second position interrupting said branch and connecting a portion thereof to said bus, a source of energy impulses, means responsive to said impulses to selectively position each of said switches in one of its two positions and switching means driven in accordance with the rotation of the one of said shafts coacting with said detenting means to selectively interrupt said branches and to cross-connect the portions of the branches so interrupted which are located between said switches and said switching means, the selection of branches so interrupted being unique for each detented position of said shaft and each such selection providing an interruption to said circuit for a unique one of the possible combinations of branch interruptions and cross connections provided by said switches.

4. In a mechanism for selectively positioning a plurality of shafts, comprising driving means for said shafts and detenting means individual to said shafts for stopping the rotation thereof in any one of a plurality of predetermined angular positions: an energizing circuit for each of said detenting means, a source of energy in said circuits, each of said energizing circuits comprising branches constituting a plurality of parallel conductive paths, a two position switch in each of said branches, a cross-connecting bus for said branches, each of said switches in a first position completing the branch in which it is located and in its second position interrupting said branch and connecting a portion thereof to said bus, a source of energy impulses, a pair of switch actuating devices, each responsive to said energy impulses and each operable to position one of said switches in a respective one of its two positions, means bringing said actuating devices into actuating positional relationship with respect to each of said switches in turn, means selectively applying an energy impulse from said source of impulses to one of said actuating devices as said actuating devices are so positioned with respect to each of said switches, and switching means driven in accordance with the rotation of the one of said shafts coacting with said detenting means, said switching means being operable to selectively interrupt said branches and to cross-connect the portions of the branches so interrupted which are located between said switches and said switching means, the selection of branches so interrupted being unique for each detented position of said shaft and each such selection providing an interruption to said circuit for a unique one of the possible combinations of branch interruptions and cross-connections provided by said switches.

5. The combination of claim 4, comprising a circuit for energizing said driving means, said circuit being normally incomplete and means actuated with the actuation of the last of said switches to complete the last named circuit.

6. The combination of claim 4, comprising a circuit for energizing said driving means, said circuit normally being incomplete, means actuated with the actuation of the last of said switches to complete said circuit, and a delayed switch energized by the receipt of the first of said impulses and operable after a fixed delay to open said circuit.

7. In a mechanism for selectively positioning a plurality of shafts, comprising driving means for said shafts and detenting means individual to said shafts for stopping the rotation thereof in any one of a plurality of predetermined angular positions: an energizing circuit for each of said detenting means, a source of energy in said circuits, each of said energizing circuits comprising branches constituting a plurality of parallel conductive paths, a two position switch in each of said branches, a cross-connecting bus for said branches, each of said switches in a first position completing the branch in which it is located and in its second position interrupting said branch and connecting a portion thereof to said bus, a source of energy impulses, a pair of switch actuating devices responsive to said impulses, means mounting said switches in a circle, an axle supporting said switch actuating devices, said axle being coaxial with said circle, said devices being so positioned as to act in opposition on each of said switches in turn as said axle is rotated, holding means to retain each of said switches in the position in which it is set, means applying impulses from said source of impulses selectively to said devices, stepping means responsive to said impulses to rotate said axle to position said devices successively in operating relation to each of said swiches, and switching means individual to and driven in accordance with the rotation of each of said shafts, said switching means being driven in accordance with the rotation of the one of said shafts coacting with said detenting means to selectively interrupt said branches and to cross-connect the portions of the branches so interrupted which are located between said switches and said switching means, the selection of branches so interrupted being unique for each detented position of said shaft and each such selection providing an interruption to said circuit for a unique one of the possible combinations of branch interruptions and cross-connections provided by said switches.

8. The combination of claim 7, comprising an energizing circuit for said driving means, means driven in accordance with the rotation of said axle to interrupt said energizing circuit while said switches are being positioned and to complete said energizing circuit as the last of said switches is positioned, and delayed operating means for opening said circuit, said delayed operating means being responsive to the receipt of the first of said impulses.

9. In a mechanism for selectively positioning a plurality of shafts, comprising driving means for said shafts and detenting means individual to said shafts for stopping the rotation thereof in any one of a plurality of predetermined angular positions: an energizing circuit for each of said detenting means, a source of energy in said circuits, each of said energizing circuits comprising branches constituting a plurality of parallel conductive paths, a two position switch in each of said branches, a cross-connecting bus for said branches, each of said switches in a first position completing the branch in which it is located and in its second position interrupting said branch and connecting a portion thereof to said bus, a source of energy impulses, means responsive to said impulses to simultaneously actuate corresponding switches of each of said energizing circuits, means connecting said impulse responsive means sequentially to said source of impulses, means holding said switches in the positions to which they are so actuated, and switching means driven in accordance with the rotation of the one of said shifts coacting with said detenting means to selectively interrupt said branches and to cross-connect the portions of the branches so interrupted which are located between said switches and said switching means, the selection of branches so interrupted being unique for each detented position of said shaft and each such selection providing an interruption to said circuit for a unique one of the possible combinations of branch interruptions and cross-connections provided by said switches.

10. In a mechanism for selectively positioning a plurality of shafts, comprising driving means for said shafts and detenting means individual to said shafts for stopping the rotation thereof in any one of a plurality of predetermined angular positions: an energizing circuit for each of said detenting means, a source of energy in said circuits, each of said energizing circuits comprising branches constituting a plurality of parallel conductive paths, a two position switch in each of said branches, a cross-connecting bus for said branches, each of said switches in a first position completing the branch in which it is located and in its second position interrupting said branch and connecting a portion thereof to said bus, a source of energy impulses, means responsive to said impulses to simultaneously actuate corresponding switches of each of said energizing circuits, means connecting said impulse responsive means sequentially to said source of impulses, means holding said switches in the positions to which they are so actuated, means energizing said driving means upon the completion of the actuation of the last of said switches and simultaneously completing the energizing circuit for the first of said shafts, switching means driven in accordance with the rotation of each of said shafts, said switching means selectively interrupting the branches of the energizing circuit associated with said shaft and simultaneously cross-connecting the portions of the branches so interrupted which are located between said switches and said switching means, the selection of branches so interrupted being unique for each detented position of said shaft and each such selection providing an interruption to said circuit for a unique one of the possible combinations of branch interruptions and cross-connections provided by said switches, means deenergizing said driving means when the energizing circuit associated with said first shaft is opened and simultaneously deactivating said holding means and connecting said impulse responsive means associated with the first of said switches to said source, whereby said positioning means in conditioned for the positioning of the second of said shafts.

11. In a mechanism for selectively positioning a plurality of shafts, comprising driving means for said shafts and detenting means individual to said shafts for stopping the rotation thereof in any one of a plurality of predetermined angular positions: an energizing circuit for each of said detenting means, a source of energy in said circuits, each of said energizing circuits comprising branches constituting a plurality of parallel conductive paths, a two position switch in each of said branches, a cross-connecting bus for said branches, each of said switches in a first position completing the branch in which it is located and in its second position interrupting said branch and connecting a portion thereof to said bus, means normally biasing all of said switches to said first position, a source of energy impulses, means responsive to said impulses to simultaneously actuate the corresponding switches of each of said energizing circuits to said second position, means connecting said impulse responsive means sequentially to said source of impulses, means holding said switches in the positions to which they are so actuated, and switching means driven in accordance with the rotation of the one of said shafts coacting with said detenting means to selectively interrupt said branches and to simultaneously cross-connect the portions of the branches so interrupted which are located between said switches and said switching means, the selection of branches so interrupted being unique for each detented position of said shaft and each such selection providing an interruption to said circuit for a unique one of the possible combinations of branch interruptions and cross-connections provided by said switches.

12. In a mechanism for selectively positioning a plurality of shafts, comprising driving means for said shafts and detenting means individual to said shafts for stopping the rotation thereof in any one of a plurality of predetermined angular positions: an energizing circuit for each of said detenting means, a source of energy in said circuits, each of said energizing circuits comprising branches constituting a plurality of parallel conductive paths, a two position switch in each of said branches, a cross-connecting bus for said branches, each of said switches in a first position completing the branch in which it is located and in its second position interrupting said branch and connecting a portion thereof to said bus, means normally biasing all of said switches to said first position, a first and a second source of energy impulses, means responsive to impulses from said first source of impulses to simultaneously actuate the corresponding switches of each of said energizing circuits to said second position, means connecting said impulse responsive means sequentially to said first source of impulses, means holding said switches in the positions to which they are so actuated, means energizing said driving means upon the completion of the actuation of the last of said switches and simultaneously completing the energizing circuit for the first of said shafts, switching means driven in accordance with the rotation of each of said shafts, said switching means being operative to selectively interrupt the branches of the energizing circuit associated with said shaft and to simultaneously cross-connect the portions of the branches so interrupted which are located between said switches and said switching means, the selection of branches so interrupted being unique for each detented position of said shaft and each selection providing an interruption to said circuit for a unique one of the possible combinations of branch interruptions and cross-connections provided by said switches, means deenergizing said driving means when the energizing circuit associated with said first shaft is opened and simultaneously deactivating said holding means and connecting said impulse responsive means associated with the first of said switches to said first source of impulses, whereby said positioning means is conditioned for the positioning of the second of said shafts.

13. In a mechanism for selectively positioning a plurality of shafts, comprising driving means for said shafts and detenting means individual to said shafts for stopping the rotation thereof in any one of a plurality of predetermined angular positions: an energizing circuit for each of said detenting means, a source of energy in said circuits, each of said energizing circuits comprising branches constituting a plurality of parallel conductive paths, a two position switch in each of said branches, a cross-connecting bus for said branches, each of said switches in a first position completing the branch in which it is located and in its second position interrupting said branch and connecting a portion thereof to said bus, means normally biasing all of said switches to said first position, a first and a second source of energy impulses, means responsive to impulses from said first source of impulses to simultaneously actuate corresponding switches of each of said energizing circuits to said second position, means connecting said impulse responsive means sequentially to said first source, said connecting means including indexing means responsive to each of said impulses, means applying impulses from both said sources to said indexing means, means holding said switches in the positions to which they are so actuated, means energizing said driving means upon the completion of the actuation of the last of said switches and simultaneously completing the energizing circuit for the first of said shafts, switching means driven in accordance with the rotation of each of said shafts, said switching means being operative to selectively interrupt the branches of the energizing circuit associated with said shaft and to simultaneously cross-connect the portions of the branches so interrupted which are located between said switches and said switching means, the selection of branches so interrupted being unique for each detented position of said shaft and each such selection providing an interruption to said circuit for a unique one of the possible combinations of branch interruptions and cross-connections provided by said switches, means deenergizing said driving means when the energizing circuit associated with said first shaft is opened and simultaneously deactivating said holding means and connecting said impulse responsive means associated with the first of said switches to said first source, whereby said positioning means is conditioned for the positioning of the second of said shafts.

References Cited in the file of this patent

UNITED STATES PATENTS

| | | |
|---|---|---|
| 2,145,895 | Samuelson | Feb. 7, 1939 |
| 2,413,211 | Brian | Dec. 24, 1946 |
| 2,431,408 | MacSorley | Nov. 25, 1947 |
| 2,474,663 | Goddard | June 28, 1949 |
| 2,522,881 | Lindner et al. | Sept. 19, 1950 |